(12) United States Patent
Lackey et al.

(10) Patent No.: US 6,802,897 B1
(45) Date of Patent: Oct. 12, 2004

(54) BIODIESEL SULFUR SLURRY

(75) Inventors: Kenneth R. Lackey, Gallatin, TN (US); James R. Alcorn, II, Hebron, KY (US)

(73) Assignee: Marathon Ashland Petroleum LLC, Findlay, OH (US)

( * ) Notice: Subject to any disclaimer, the term of this patent is extended or adjusted under 35 U.S.C. 154(b) by 0 days.

(21) Appl. No.: 10/448,251

(22) Filed: May 29, 2003

Related U.S. Application Data

(60) Provisional application No. 60/385,277, filed on May 31, 2002.

(51) Int. Cl.$^7$ .................. C08K 13/02; C08K 5/101; C08K 3/06
(52) U.S. Cl. .................. 106/503; 106/274; 106/275; 106/279; 106/280; 106/281.1; 106/287.24; 524/59
(58) Field of Search .................. 106/274, 275, 106/279, 280, 281.1, 287.24, 503; 524/59

(56) References Cited

U.S. PATENT DOCUMENTS

| | | | |
|---|---|---|---|
| 6,001,162 A | | 12/1999 | Hayner et al. |
| 6,015,440 A | * | 1/2000 | Noureddini .................. 44/388 |
| 6,133,351 A | * | 10/2000 | Hayner .................. 524/62 |
| 6,153,004 A | * | 11/2000 | Hayner .................. 106/274 |
| 6,174,501 B1 | | 1/2001 | Noureddini |
| 6,203,585 B1 | | 3/2001 | Majerczak |
| 6,235,104 B1 | | 5/2001 | Chattopadhyay et al. |
| 6,348,074 B2 | | 2/2002 | Wenzel |
| 6,414,056 B1 | | 7/2002 | Puzic et al. |
| 6,414,066 B1 | | 7/2002 | Lem et al. |
| 6,416,249 B1 | | 7/2002 | Crupi |
| 6,417,421 B1 | | 7/2002 | Yao |
| 6,548,580 B1 | * | 4/2003 | Rohde et al. .................. 524/100 |
| 2002/0026884 A1 | | 3/2002 | Raad |

\* cited by examiner

*Primary Examiner*—David Brunsman
(74) *Attorney, Agent, or Firm*—Emch, Schaffer, Schaub & Porcello Co., L.P.A.

(57) ABSTRACT

A slurry mixture of sulfur in a liquid carrier comprising an ester derived from vegetable oils or animals fats such as biodiesel is disclosed. Also disclosed is a method of preparing a mixture of asphalt, polymer and sulfur comprising blending together, at asphalt blending conditions, the asphalt and a slurry of sulfur particles in a biodiesel liquid carrier comprising an ester derived from vegetable oils or animal fats.

24 Claims, No Drawings

BIODIESEL SULFUR SLURRY

CROSS-REFERENCE TO RELATED APPLICATIONS

This application claims the benefit of U.S. Provisional Application Ser. No. 60/385,277 filed May 31, 2002.

BACKGROUND OF THE INVENTION

1. Field of the Invention

The invention relates to a slurry of sulfur in a liquid carrier comprising at least one biodiesel, the use of the sulfur as a cross-linking agent for cross-linkable molecules, and asphalt compositions containing asphalt and sulfur/biodiesel slurry.

2. Description of the Prior Art

Road building has been a source of inspiration and aggravation for civilization for millennia. Ancient Rome built roads that would last for centuries, but which required an enormous investment in labor and materials and a high level of sophistication. In the 1830's, travelers prized the opportunity to travel on short stretches of macadam roads made of three layers of graded stone, the top layer of which contained some bituminous or asphaltic binder.

The need to reduce costs and use locally available materials led to wooden plank roads, which were, in turn, replaced with asphalt roads. By the early $20^{th}$ century, asphalt roads, mixtures of gravel and asphaltic petroleum fractions, were the dominant roads. Many times an asphalt gravel mix/was simply poured on a minimally prepared surface. Such roads could be built cheaply and quickly with unsophisticated labor, but such roads deteriorated rapidly.

Roman roads lasted for centuries, but took decades to build. Macadam roads, built according to the original rigid specifications of 1830, lasted for decades, but took months or years to build. Many asphalt roads were built in weeks or months only to deteriorate after a few years. Asphalt roads that deteriorate rapidly do so because of lack of surface preparation and drainage, poor construction practices, and poor quality materials.

Asphalt roads have come full circle. The early macadam roads were prized for their quality and durability. Many modern macadam roads suffer a largely undeserved poor reputation for quality.

There is a renewed interest in building quality roads with asphalt as civil engineers and municipalities realize that better asphalt roads are possible by using better surface preparation, construction practices, and better asphalts.

Some improvements in asphalt properties were achieved by selecting the starting crude petroleum, or control of the refinery processing steps used to make the asphalt. Unfortunately, there are many crudes which do not make good asphalts. There are only a limited number of steps which can be taken to control the refining process to make better asphalt.

The next step taken by the industry was to modify the asphalt. Air blowing makes asphalts harder. Fluxing agents or diluent oils are sometimes used to soften the asphalt.

Marked changes in asphalt properties can be achieved with sulfur, either added to neat asphalt or when added as a cross-linking agent to treat a mixture of asphalt and polymer.

The conventional methods of adding sulfur (dumping loose powder or bags of powdered sulfur on top of molten asphalt in a mix tank) had some problems. Of significant concern is safety. There exists the potential for fire and explosion hazards, caused by having a potentially large cloud of hot and flammable sulfur dust. Sulfur dust is by its very nature considered explosive.

It is also difficult in a commercial facility to rapidly and completely mix powdered sulfur with asphalt. Some parts of the asphalt contained too much sulfur too rapidly while other parts of the blend were sulfur deficient. Such an approach, led to over cross-linking parts of the blend, forming lumps of super-vulcanized materials which were not compatible with the rest of the blend.

U.S. Pat. No. 6,153,004, Hayner and U.S. Pat. No. 6,133,351, Hayner, which are expressly incorporated herein by reference, disclosed use of a sulfur slurry for sulfur addition to asphalt, rather than dry, powdered sulfur. In a preferred embodiment, the finely ground sulfur was mixed with a portion of a flux oil which would be added to the asphalt. The '004 and 351 patents described the use of suitable flux oils found in myriad refinery streams, including various neutral oils, aromatic extract, vacuum gas oil and refinery bottoms streams.

While the sulfur slurry method taught in the '004 and '351 patents was a significant improvement over the state of the art in asphalt manufacture, there are some areas where further improvement is still needed. Sulfur slurries, if not used fairly promptly after manufacture, can settle into a S rich sludge and a S lean oil phase above the sludge. Remixing (or prompt use) solves this problem, but it is a nuisance and time-consuming, which, in turn, raises the costs.

One attempt to solve these problems included the use of relatively heavy liquid refinery streams, which reduced hydrocarbon vapor pressure and made the sulfur slurry safer to use, but produced relatively viscous slurries which were hard to pump.

There are also concerns about, and some localities have limits on, exposure of workers to aromatics. Essentially all refinery streams heavier than gasoline have significant amounts of aromatics present, unless the aromatics have been removed or hydrotreated so severely as to saturate the aromatics.

In addition, the conventional refinery liquid streams can have a significant vapor pressure, leading to risk of fire and even, in some cases, of explosion. Although the risk of explosion can be eliminated, and the risk of fire greatly reduced by using a higher boiling liquid hydrocarbon stream, the higher boiling streams are more viscous and difficult to pump.

SUMMARY OF THE INVENTION

The present invention provide a slurry of sulfur in a liquid carrier comprising as ester derived from vegetable oils or animal fats. In one aspect, the present invention relates to the use a natural biodiesel, derived from vegetable oils or animal fats, as the liquid part of the sulfur slurry. So far as is known, biodiesel has never been used to form a sulfur slurry until the present invention. Rather, the only use of biodiesel to form a slurry was described in Development of Biodiesel Slurry Fuels, reported on page 57 of Biodiesel Research Progress 1992–1997, K. Shaine Tyseon, Editor, available on WWW at http://www.ott.doe.gov/biofuels/pdfs/biodiesel 92–97.pdf, which paper is incorporated herein by reference. The slurry fuel described therein was finely ground (LT 100 micron) corn or sorghum in biodiesel.

Biodiesel is now well known and widely available commercially and extensively studied, as shown by over 100 papers included in the report, Biodiesel Research Progress, discussed above. Biodiesels are attractive for fuels, and some other uses, because they have a low vapor pressure, are non-toxic and are stable, as per HMIS regulation, and do not deteriorate or detonate upon mild heating. Chemically, biodiesels are generally defined as the mono alkyl esters of long chain fatty acids derived from renewable lipid sources.

Although these benefits (safety, toxicity) are characteristic of biodiesel, it was not until the present invention that the inventors herein thought to look at biodiesel as a suitable vehicle for getting sulfur into an asphalt blend. In particular, there were some concerns about compatibility of biodiesel in asphalt. Asphalt is high molecular weight and highly aromatic. In contrast, biodiesel is aliphatic, contains no sulfur, has no ring structures or aromatics, and is relatively in low molecular weight, as compared to asphalt. Also, biodiesel also contains large amounts of oxygen, approaching 10%. Until the present invention is was believed that a linear, relatively low molecular weight, aliphatic molecule such as biodiesel would be better for precipitating asphalt from crude oil than for efficiently dispersing a sulfur slurry into asphalt.

Despite these concerns, it was surprisingly found by the inventors herein that the aliphatic biodiesel sulfur slurry was completely satisfactory. The use of biodiesel provides the benefits of fire hazard safety and low toxicity and is a satisfactory vehicle for the sulfur particles. In addition, the sulfur-in-biodiesel suspension is relatively stable and does not separate as rapidly as do sulfur slurries that contain petroleum refinery derived liquid streams. The asphalt did not "reject" the biodiesel sulfur slurry; that is, there were no problems with phase compatibility, and the biodiesel sulfur slurry could rapidly be mixed with the asphalt. The biodiesel sulfur slurry of the present invention has a relatively low viscosity, at least lower than the refinery liquid streams previously being used, and is easy to pump.

While we do not wish to be bound by any theory of why use of biodiesel sulfur slurry gives superior results, we believe the biodiesel additive facilitates dispersion of sulfur within the mixture. The biodiesel is a fatty acid reacted with an alcohol, and the reaction product (the ester) tends to "wet" both sulfur and aggregate better than typical fuel oils. Wetting agent is probably not necessary to disperse the sulfur in liquid to form the slurry.

The asphalt produced from the biodiesel sulfur slurry also seems to coat the stone better than similar asphalt made with a sulfur slurry comprising a fuel oil as the liquid.

Most surprisingly, the use of biodiesel sulfur slurry leads to an apparent increase in polymer concentration when a biodiesel sulfur slurry is used as a cross-linker for polymer/asphalt blends. The biodiesel sulfur slurry of the present invention is readily dispersible in the asphalt and does not lead to over- or under- cross-linked parts of the asphalt blend, would have been expected before this invention. It was not expected that the biodiesel sulfur slurry would make the polymer blended in the asphalt more effective, but this is what the data shows.

Also, it should be understood that the polymer is the most expensive part of the asphalt blend, and by use of the present invention, it is now possible to reduce the amount of this expensive component, or, alternatively, to increase its effectiveness, by changing the solvent for the sulfur slurry to comprise biodiesel.

The present invention also provides an improved manufacturing process by reducing the amount of sulfur settlement that occurs in an asphalt mixture, which, in turn allows for easy remixing of the asphalt mixture. Also, the improved distribution of sulfur in the polymerized asphalt cement manufacturing reduces the amount of raw polymer required to meet finished product specifications. The present invention also provides a less viscous sulfur slurry mixture which is easier to pump.

In another aspect, the present invention provides a method of preparing a mixture of asphalt, polymer and sulfur comprising blending together at asphalt blending conditions said asphalt and a slurry of sulfur particles in a liquid carrier comprising an ester derived from vegetable oils or animal fats.

In yet another embodiment, the present invention provides a method of enhancing the effectiveness of particles of sulfur as a cross-linking agent for a cross-linkable molecule, preferably at least one of aromatic molecules or polymer, comprising providing said sulfur as a slurry or sulfur in a liquid carrier comprising an ester derived from vegetable oils or animal fats.

In another aspect, the invention relates to a pavement composition comprising aggregate and from about 1.0% to about 10.0% of an asphalt composition comprising sulfur and biodiesel.

DETAILED DESCRIPTION OF THE PREFERRED EMBODIMENT(S)

a) Asphalt Components

The term "asphalt" (sometimes referred to as "bitumen") refers to all types of asphalts (bitumen), including those asphalts that occur in nature and those obtained in petroleum processing. The choice of asphalt will depend essentially on the particular application intended for the resulting bitumen composition. Preferred materials have an initial viscosity at 140° F. (60° C.) of 200 to 6000 poise. The initial penetration range of the base asphalt at 77° F. (25° C.) is 30 to 350 dmm, preferably 50 to 200 dmm, when the intended use of the composition is road paving. Asphalt, which does not contain any polymer, sulfur, etc., may sometimes be referred to herein as a "base asphalt". The asphalt per se, can be conventional and forms not part of the present invention.

Suitable asphalt components include a variety of organic materials, solid or semi-solid, at room temperature, which gradually liquefy when heated, and in which the predominate constituents are naturally occurring bitumens, e.g., Trinidad Lake, or residues commonly obtained in petroleum, synthetic petroleum, or shale oil refining, or from coal tar or the like. For example, vacuum tower bottoms produced during the refining of conventional or synthetic petroleum oils are a common residue material useful as asphalt composition. Solvent deasphalting or distillation may produce the asphalt.

Solvent deasphalting (SDA) bottoms may be used as part of all of the asphalt of the product blend. SDA bottoms are obtained from suitable feeds such as vacuum tower bottoms, reduced crude (atmospheric), topped crude, and preferably hydrocarbons comprising an initial boiling point of about 450° C. (850° F.) or above. Preferably the solvent deasphalting bottoms are obtained from vacuum tower bottoms, preferably boiling above 538° C. (1000° F.). Solvent deasphalting can be carried out at temperatures of 93–148° C. (200–300° F.). After solvent deasphalting, the resulting SDA bottoms have a boiling point above 510° C. (950° F.), preferably above 540C (1000° F.), and a penetration of 0 to 70 dmm @ 25° C. (77° F.), preferably 0 to 50 dmm @ 25° C. (77° F.).

b) Asphalt Cement

The asphalt composition may be solely or partly material produced by distillation, without any solvent extraction step.

Such materials, sometimes referred to as "asphalt cement", have a reduced viscosity relative to SDA bottoms. Such asphalt cement component can have a viscosity of 100 to 5000 poises at 60° C. (140° F.), preferably 250 to 4000 poises, e.g., 500 poises for AC5 (PG52-28) asphalt cement. The asphalt cement component is added in amounts sufficient to provide the resulting asphalt composition with the desired viscosity for the intended application, e.g., 2000 poises at 60° C. (140° F.) for paving applications. For Performance Graded (PG) applications, the asphalt compositions will have a G*/sin delta value in excess of 1.0 kPa at temperatures ranging from 46 to 82° C., preferably 52 to 76° C. Generally, the asphalt compositions of the present invention may contain from 0 to 100 wt %, preferably from 0 to 90 wt %, e.g., 5 to 95 wt %, of such asphalt cement component. The asphalt cement component of reduced viscosity can be obtained from any suitable source, e.g., atmospheric distillation bottoms.

c) Fluxing Components

Fluxing components may be added to improve the flow properties of the asphalt composition and improve the penetration for a desired softening point. Such fluxing components can include paraffinic as well as aromatic materials, e.g., gas oils (which can contain both isoparaffins and monoaromatics). Gas oils include neutral oils, including hydrotreated, hydrocracked, or isodewaxed neutral oils. Suitable paraffinic fluxing components include paraffinic oils having at least 50 wt % paraffins content (isoparaffins and normal paraffins) such as footes oil (which is highly paraffinic and obtained from deoiling slack wax), as well as slack wax itself. Poly(alphaolefins) (PAOs) are also suited for use as fluxing components. Aromatic oils such as lube plant extract may also be used, but are not preferred due to the high aromatic content.

The primary constraints on the fluxing components are safety and compatibility. The material should be relatively non-volatile, i.e., have initial boiling points above 600° F. The oil should also be chosen so as to minimize health effects. There is no upper limit, per se, on boiling point, and many suitable oils will have end points in the 1000+° F. range. The material preferably has a viscosity similar to that of neutral oils, or higher.

Although the flux oil was used in Hayner's patents to form the sulfur slurry, it is preferable if the flux oil is used primarily as an asphalt modifier rather than as a carrier for the sulfur, though the biodiesel sulfur slurry, discussed in more detail below, may contain some flux oil or other conventional liquid streams from a refinery.

d) Polymer

Many times, especially for high performance asphalt such as SHRP asphalts, the asphalt will contain a polymer or ground up tire rubber or some other "plastic" like material which can be dispersed or dissolved in the asphalt to swell and form a matrix.

Any polymer or copolymer or rubber additive previously used to modify the properties of asphalt can be used herein.

Particularly useful is the addition of Styrene Butadiene (SB) copolymers or SBS (styrene butadiene styrene) to the asphalt. Suitable polymers include styrene-butadiene, such as those taught in U.S. Pat. No. 4,554,313 to Hagenbach (assigned Elf); U.S. Pat. No. 4,242,246 to Maldonado (Elf); U.S. Pat. No. 4,162,999 to Bohemen (British Petroleum); U.S. Pat. No. 5,120,777 to Chaverot (Elf); U.S. Pat. No. 4,567,222 to Hagenbach (Elf); U.S. Pat. No. 5,118,733 to Gelles (Shell); U.S. Pat. No. 5,039,342 to Jelling (National Patent Development); U.S. Pat. No. 5,023,282 to Neubert (GenCorp); U.S. Pat. No. 3,238,173 to Bailey (Shell); U.S. Pat. No. 4,585,816 to Vitkuske (Dow Chemical) (diene/vinyl aromatic block copolymers, e.g., methylstyrene, tertiary butyl styrene, etc.); U.S. Pat. No. 5,059,300 to McGinnis (Chevron) (phosphoric acid); U.S. Pat. No. 4,393,155 to Garrett (Ashland Oil) (polyacrylamides). It is especially preferred to use styrene-butadiene copolymers or styrene-butadiene-styrene (SBS) copolymers to form the blended asphalt products of the present invention. Ground up particles from automobile or truck tires and the like may also be used.

Such polymers (or copolymers) are added in conventional amounts, typically 0.1 to 20 wt %, preferably 0.5 to 12 wt %, and most preferably 1 to 5 wt % of the finished asphalt product.

e) Asphalt/Polymer Blending

Conventional conditions may be used to blend the base bitumen (or base asphalt) with the polymer (or copolymer or rubber).

High shear mixing is a preferred blending method, using a device such as a Reichel-Drews Polymer Unit equipped with a super high shear mill, operating for 10 to 240 minutes at a temperature of 200 to 400° F.

Other conventional mixing techniques may be used; for example, use of blades or impellers to stir a tank of the material, use of low efficiency pumps to transfer the material from vessel to another, use of static mixers, and the like.

f) Polymer Swelling

Preferably the polymer matrix is allowed to swell so that it is at least 100% larger in volume, more preferably 200% or more of its original volume, in the asphalt/polymer blend. Ideally the polymer is allowed to stay mixed with the asphalt for a period of time-sufficient to permit the polymer to digest and swell to a polymer/asphalt matrix 20 times, 25 times, 28 times, or even higher of its original size.

This step can take from 0.1 to 24 hours or more, depending on temperature, polymer, polymer size, and amount of oil present. Usually, this step will take from 0.5 to 20 hours, with very good results obtained within 1 to 12 hours of polymer swelling.

It should be emphasized that these materials (asphalt cement and polymer, if used) as well as the method of blending and are conventional and form no part of the invention.

g) Sulfur

In certain embodiments, many customers will add sufficient sulfur to incorporate into the final blend asphalt product from about 0.01 to about 1.0 wt % sulfur, preferably about 0.025 to about 0.5 wt % sulfur, e.g., and more preferably about 0.05 to about 0.2 wt %. Customers wanting or needing higher sulfur contents may add sufficient sulfur slurry to produce finished asphalt blends with 1, 2, 3, 4, 5, 6, 7, 8, 9 or 10 wt % sulfur, or even more. There is no "lower limit" on sulfur concentration in the sulfur slurry, other than one set by economics of using such a dilute sulfur "solution." The upper limit on sulfur concentration is set by pumpability and to some extent by the nature of the biodiesel material used to form the sulfur slurry. In practice, a 50/50 (by weight) blend works well and makes it easy for customers to calculate how much sulfur slurry is needed, e.g., specify 0.2 wt % slurry addition to add 0.1 wt % sulfur to the final blended asphalt product. If desired, additives such as surfactants, thickeners, stabilizers, emulsifiers, etc. may be added.

The reactive sulfur compound used in the present invention is preferably elemental sulfur, preferably in a finely ground or divided form. Sulfur is a well-known additive for asphalt and may be added in conventional amounts. What is novel in the present invention is that sulfur is added to a liquid carrier comprising at least one biodiesel material. Those wishing to add very small amounts of sulfur to the asphalt may do so by adding small amounts of sulfur/biodiesel slurry. Those wishing to add large amounts of sulfur may do so by adding larger amounts of sulfur/biodiesel slurry, or increasing the sulfur concentration in the sulfur/biodiesel slurry.

h) Biodiesel

The biodiesel is a well-known product and is readily available commercially, so only a limited discussion thereof is believed necessary.

As reported by the Canadian Renewable Fuels Association, on their WWW site, biodiesel is referred to as the mono alkyl esters of long chain fatty acids derived from renewable lipid sources. Others have defined biodiesel as a material made from vegetable oils or animal fats.

All biodiesels are based on triglycerides, three fatty acids bound by glycerol. If the source is animal fat, e.g., tallow or lard or whale oil, the fatty acids are saturated, that is they contain no double bonds. If the source is vegetable, the fatty acids are unsaturated, they contain one or more double bonds. Some highly unconventional sources have also been studied, including over 20 years of work on making biodiesel from algae, as reported in Biodiesel from Algae, A Look Back at the U.S. Department of Energy's Aquatic Species Program, which reported that the algae species studied in the program could produce up to 60% of their body weight in the form of triacylglycerols, the same natural oil made by oilseed crops.

The complete report is incorporated by reference and available at http://www.ott.doe.gov/biofuels/pds/biodiesel from algae ps.pdf. One preferred route to form biodiesel is to break the fatty acids free from the glycerol.

The preferred biodiesel material for use herein comprises a mixture of fatty acids esters. Typically these materials are made by the transesterification of vegetable oil to biodiesel. One route to biodiesel involves reacting a vegetable oil (a triglyceride) with an alcohol, preferably methanol, to form biodiesel and glycerol. The biodiesel produced from vegetable oil may have the formula:

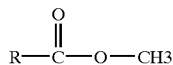

Where R is typically 16–18 carbon atoms and may contain one or more C=C bonds. In certain embodiments, the slurry of the present invention comprises a liquid carrier comprising from about 10 to about 50% biodiesel material.

More details on biodiesel manufacture may be taken from U.S. Pat. No. 6,348,074; U.S. Pat. No. 6,015,440; U.S. Pat. No. 6,203,585; U.S. Pat. No. 6,174,501 and U.S. Pat. No. 6,235,104, which are incorporated by reference.

i) Biodiesel Purity

In certain embodiments, it is preferred to use pure biodiesel as the "oil", or liquid, part of the sulfur slurry. Pure biodiesel has especially desired, or optimum, properties in terms of fire hazard, vapor emissions, toxicity and smell. It is also within the contemplated scope of the present invention to use a mixture of biodiesel and other liquids, including, for example, biodiesel +diesel, or biodiesel plus "6 oil", or biodiesel plus aromatic extract, and the like. It is also within the contemplated scope of the present invention to use biodiesel plus any "flux oil" previously used in the manufacture of asphalt or sulfur slurries, but it should be under stood that such degradation of the biodiesel will degrade the above discussed desirable properties, but not necessarily proportionally. For example, the desired low flammability properties can be greatly degraded by addition of even small amounts of ingredients such as, e.g., diesel or naphtha with a high volatility. The low toxicity characteristics of the biodiesel may be destroyed by addition of even small amounts of an aromatic stream, such as BTX.

The dilution of the biodiesel may not have a linear degrading effect on the ability of the biodiesel-liquid carrier to hold sulfur in suspension and/or enhance effectiveness of polymer in asphalt. It may be possible to preserve these properties by having sufficient biodiesel in the slurry to complex with or react in some way with the sulfur.

j) Biodiesel and Sulfur

In certain embodiments, preferably, all, or at least a portion of the total amount of, biodiesel destined for addition to the asphalt product is added with the sulfur slurry. This means that some, or all, of the biodiesel which is to be added to the asphalt product is slurried with sulfur and the resulting slurry of sulfur in liquid biodiesel is added to the (asphalt+polymer) blend.

The sulfur may comprise from about 0.1 to about 80 wt % of the slurry, with the balance being the liquid biodiesel. Preferably the sulfur slurry has a sulfur content of about 10 to about 60 wt %, with the balance being liquid biodiesel. A suitable high shear mixing device is a Should, Reichel-Drews, or Cowels type disperser for Kettle type dispersion mixtures. Ross, Siefer or Dalworth high shear inline mills may also be used for larger production batches. Slurries may also be produced using conventional ball type mills commonly used for pigment dispersion manufacture in the paint and coatings industry.

The sulfur slurry may be formed by mixing dry powdered sulfur, having a small average particle size, with the biodiesel and mixing for 10–240 minutes at 70–250° F. There is nothing novel about adding finely ground sulfur to asphalt; this has been practiced for decades and detailed discussion is not necessary for those skilled in the asphalt arts. Ground sulfur is a staple article of commerce, with extensive use in rubber making and as a pesticide.

Other Sulfur Sources

While finely ground elemental sulfur slurry is a preferred source of sulfur cross-linking agent, it is also possible to use other hydrocarbon based sulfur sources, though not necessarily with equivalent results. Sulfurized oils, disulfide oils, and other hydrocarbon streams containing naturally occurring sulfur compounds may also be used though generally somewhat larger amounts of sulfur will be required. While use of chemically bound, hydrocarbon phase, sulfur cross-linking agent is not as efficient in terms of total sulfur usage required, the hydrocarbon liquid phase sulfur does avoid localized high concentrations of sulfur which will occur when powdered sulfur is added.

Blending

Conventional conditions may be used to blend the base bitumen (or base asphalt) with the sulfur slurry. High shear mixing is a preferred blending method, using a device such as a Reichel-Drews Polymer Unit equipped with a super high shear mill, operating for 10 to 240 minutes at a temperature of 200 to 4000° F. Other conventional mixing techniques may be used, including for example, use of blades or impellers to stir a tank of the material, use of low efficiency pumps to transfer the material from vessel to another, use of static mixers, and the like.

Sulfur Treatment

The conditions for treatment with elemental sulfur comprise temperatures of 100 to 300° C. (220 to 572° F.), preferably 110 to 250° C. (230 to 482° F.) a time from 1 or 2 minutes to 5 to 10 hours, preferably 0.1 to 4 hours, e.g., 0.5 to 2 hours. In practice, the blending of asphalt+sulfur slurry will usually occur at a temperature above the melting point of sulfur, so the sulfur treating reaction proceeds quickly. In practice, much of the sulfur treating will take place in trucks delivering hot product.

k) Asphalt/Polymer Uses

When the biodiesel sulfur slurry is used to cross-link a polymer in asphalt, the techniques used in U.S. Pat. No. 6,133,351 may be used herein and this patent is incorporated by reference. Thorough mixing of polymer and asphalt is a preferred first step, if necessary followed by additional time to allow the polymer to swell and form a web or mesh of material in the asphalt. Then the sulfur slurry may be added to cross-link.

Although this approach (mixing asphalt+polymer, then add cross-linking agent) is preferred, the biodiesel sulfur slurry may also be used to add sulfur to asphalt, even when no polymer is present. The sulfur will change the asphalt properties, and it may be necessary at times to change asphalt properties by the addition of sulfur, or other additives, and in such cases, the biodiesel may be used as a vehicle for the transport of the sulfur, plus any other additive desired, into the asphalt.

l) Ranges of Materials Used

| | Suitable ranges of materials include: | | |
| --- | --- | --- | --- |
| | Broad | Preferred | Most Preferred |
| Asphalt Cement | 80.0 to 99.98% | 80.0 to 99.9% | 90.0 to 98.0% |
| Biodiesel | 0.01 to 10.0% | 0.05 to 15.0% | 1.0% to 10.0% |
| Sulfur | 0.01 to 10.0% | 0.05 to 5.0% | 0.05 to 0.5% |

The sulfur and biodiesel slurry blend is pre-dispersed at high shear with or without the use of dispersants or surfactants. The mixture is injected into the asphalt preferably with mixing. The asphalt-sulfur slurry mixture is preferably reacted at temperatures of 200–500° F. For clarity, it is to be understood that much of the blending process is conventional and forms no part of the present invention. However, while the starting asphalt (or bitumen) materials are well known, it is novel to add sulfur and biodiesel improve the blend. If desired, additives such as surfactants, thickeners, stabilizers, emulsifiers, etc. may be added. A source of sulfur is the Harwick Chemical Manufacturing Company, a subsidiary of the M. A. Hanna Company.

The reactive sulfur compound used in the present invention is preferably elemental sulfur, preferably in a finely ground or divided form. Sulfur is a well-known additive for asphalt and may be added in conventional amounts. What is different is the way the sulfur is added, not the amount.

Those wishing to add very small amounts of sulfur to the asphalt may do so by adding small amounts of sulfur/biodiesel slurry. Those wishing to add large amounts of sulfur may do so by adding larger amounts of sulfur/biodiesel slurry, or increasing the sulfur concentration in the sulfur/biodiesel slurry.

Preferably, all, or at least a portion of the total amount of, biodiesel destined for addition to the asphalt product is added with the sulfur slurry. This means that some, or all, of the biodiesel which would be added to the asphalt product is slurried with sulfur and the resulting slurry of sulfur in liquid hydrocarbon is added to the (asphalt+polymer) blend.

While use of biodiesel sulfur slurry to cross-link asphalt is an important use of this technology, the biodiesel sulfur slurry has other uses as well, i.e., it is a safe and efficacious method of adding sulfur as a cross linking agent to prompt cross-linking of any polymerizable molecule, e.g., for vulcanization of rubber. Such cross-linking applications are reviewed next.

m) Non-Asphalt Cross-Linking Applications

Elemental sulfur is widely used to vulcanize rubber, e.g., cross-link butyl rubber. The low level of unsaturation requires aggressive accelerators such as thiuram or thiocarbamates. The vulcanization proceeds at the isoprene site with the polysulfidic cross links attached at the allylic positions, displacing the allylic hydrogen. The number of sulfur atoms per cross-link is between one and four or more. Cure rate and cure state (modulus) both increase if the diolefin content is increased (higher unsaturation). Sulfur cross-links have limited satiability at sustained high temperature. Resin cure systems (commonly used alkyl phenolformaldehyde derivatives) provide for carbon-carbon cross-links and more stable compounds.

n) Other Uses of Biodiesel Sulfur Slurry

Sulfur is used for making germicides, fungicides and is used in many medicines. The biodiesel sulfur slurry is also useful in many applications where a slurry of sulfur in oil was previously used. The benefits of reduced toxicity and flammability are also beneficial in these types of applications. It should be understood that the better the sulfur dispersion is achieved using the biodiesel emulsion of the present invention, the more stable an emulsion is formed. Thus, biodiesel facilitates many manufacturing processes.

In the case of medical applications, e.g., manufacturing of latex gloves, the use of biodiesel sulfur slurry can reduce, or even eliminate, the need for conventional accelerators such as thiurams. The biodiesel is less irritating to many users and reduces the need for post vulcanization washing or processing to remove either the sulfur vehicle traces and/or accelerators or breakdown products thereof.

In another embodiment of the present invention, the slurry of the present invention is especially useful in rubber vulcanization for such applications as manufacturing of such high value products such as tires.

In other embodiments, the slurry of the present invention is useful in other types of aromatic reactions where the sulfur is cross linked with the aromatic substituents, including, for example, high molecular weight elastomer-modified compositions modified by in-situ vulcanization using sulfur as the cross-linking agent, recycling rubber compositions.

Modifications

Specific compositions, methods, or embodiments discussed are intended to be only illustrative of the invention disclosed by this specification. Variations on these compositions, methods, or embodiments are readily apparent to a person of skill in the art based upon the teachings of this specification and are, therefore, intended to be included as part of the invention disclosed herein.

Reference to documents made in the specification is intended to result in such patents or literature being expressly incorporated herein by reference, including any patents or other literature references cited within such documents.

We claim:

1. A slurry mixture comprising sulfur in a liquid carrier comprising an ester derived from vegetable oils or animal fats.

2. The slurry of claim 1 wherein the liquid carrier comprises biodiesel.

3. The slurry of claim 1 wherein the liquid carrier comprises an ester of a long chain fatty acid derived from vegetable oil or animal fat.

4. The slurry of claim 1 wherein the liquid carrier comprises at least 50 wt % ester.

5. A pavement composition comprising aggregate and from about 1.0% to about 10.0% of asphalt blend prepared using the slurry of claim 1.

6. A method of preparing a mixture of asphalt and sulfur comprising blending together, at asphalt blending conditions, the asphalt and a slurry of sulfur in a liquid carrier comprising an ester derived from vegetable oils or animal fats.

7. The method of claim 6 wherein the sulfur slurry is added in an amount sufficient to incorporate about 0.01 to about 5.0 wt % sulfur in the mixture.

8. The method of claim 6 wherein the sulfur slurry is added in an amount sufficient to incorporate about 0.05 to about 1.0 wt % sulfur in the mixture.

9. The method of claim 6 wherein the sulfur is a powdered or finely granulated form of elemental sulfur.

10. The method of claim 6 wherein the asphalt comprises a residue fraction obtained by distillation or vacuum distillation of crude oil.

11. The method of claim 6 wherein the asphalt comprises an asphaltic fraction obtained from a solvent deasphalting unit.

12. The method of claim 6 wherein the liquid carrier comprises biodiesel.

13. The method of claim 6 wherein the carrier comprises an ester of a long chain fatty acid derived from vegetable oil or animal fats.

14. The method of claim 6 wherein the liquid carrier comprises at least about 50% ester.

15. The method of claim 6 wherein the liquid carrier comprises from about 1 to about 35 wt % of the mixture.

16. The method of claim 6 wherein the sulfur slurry comprises from about 1 to about 75 wt % sulfur and sufficient liquid carrier to maintain the slurry as a pumpable blend.

17. The method of claim 6 wherein the sulfur is in the form of a finely divided powder.

18. An asphalt blend prepared by the method of claim 5.

19. The method of claim 6 wherein the mixture further comprises a polymer.

20. A pavement or paving composition comprising aggregate and from about 1.0% to about 10.0% of an asphalt composition comprising sulfur and biodiesel.

21. A method of enhancing the effectiveness of sulfur as a cross-linking agent for at least one of aromatic molecules or polymer comprising providing the sulfur as a slurry of sulfur in a liquid carrier comprising an ester derived from vegetable oils or animal fats.

22. The method of claim 21 wherein the liquid carrier comprises biodiesel.

23. The method of claim 21 wherein the carrier comprises as ester of a long chain fatty acid derived from vegetable oil or animal fats.

24. The method of claim 21 wherein the liquid carrier comprises at least about 50% ester.

* * * * *